United States Patent [19]

Woerman

[11] Patent Number: 4,652,196
[45] Date of Patent: Mar. 24, 1987

[54] LIFTER-CARRIER FOR CYLINDRICAL OBJECTS

[76] Inventor: Gary R. Woerman, 434 Rothbury Dr., Bolingbrook, Ill. 60439

[21] Appl. No.: 748,624

[22] Filed: Jun. 25, 1985

Related U.S. Application Data

[63] Continuation-in-part of Ser. No. 587,817, Mar. 9, 1984, abandoned.

[51] Int. Cl.⁴ .......................... A01D 87/12; B60P 1/02
[52] U.S. Cl. .................. 414/24.5; 280/43.23; 280/423 B; 414/458; 414/483
[58] Field of Search ............ 414/24.5, 24.6, 458, 414/459, 476, 481, 483, 495; 280/39, 43.15, 43.16, 43.23, 43.24, 656, 423 B

[56] References Cited

U.S. PATENT DOCUMENTS

| | | | |
|---|---|---|---|
| 2,415,026 | 1/1947 | Brown | 280/43.23 |
| 2,461,479 | 2/1949 | Moffat | 280/43.16 X |
| 3,356,239 | 12/1967 | Klein | 414/458 |
| 3,840,252 | 10/1974 | Jocoy | 280/423 B X |
| 4,015,735 | 4/1977 | Berglund et al. | 414/458 X |
| 4,204,790 | 5/1980 | Baxter | 414/24.5 |
| 4,248,560 | 2/1981 | Roose | 414/24.5 |
| 4,266,898 | 5/1981 | Jacobsen et al. | 414/24.5 |
| 4,372,572 | 2/1983 | Verschage | 280/423 B |

FOREIGN PATENT DOCUMENTS

| | | | |
|---|---|---|---|
| 1086688 | 9/1980 | Canada | 414/24.5 |
| 2821991 | 11/1979 | Fed. Rep. of Germany | 414/24.5 |

Primary Examiner—Leslie J. Paperner
Attorney, Agent, or Firm—Hiram A. Sturges

[57] ABSTRACT

A lifter-carrier for lifting and carrying cylindrical objects such as hay bales on two booms adapted to slide under the curved sides of at least one cylindrical object. The booms are raisable to a position above the ground to carry the objects on wheels under the booms and under a towing assembly which can be a tractor or truck.

4 Claims, 7 Drawing Figures

4,652,196

LIFTER-CARRIER FOR CYLINDRICAL OBJECTS

This is a continuation-in-part application of Ser. No. 587,817, filed Mar. 9, 1984, now abandoned.

BACKGROUND OF THE INVENTION

1. Field of the Invention

This invention is an improved and simplified type of forklift vehicle particularly designed and constructed to facilitate the retrieval of cylindrical objects such as hay bales and positioning bales end to end to prevent exposure to the weather in a preselected location.

2. Description of the Prior Act

In recent years, it has become commonplace to bind bales of hay in a cylindrical shape with automated hay baling equipment. These cylindrical hay bales are normally left in the field by the baling equipment and must be picked up later for transport to the desired storage site. The bales are large and can weigh up to 1500 pounds. The diameter and length of the bale varies depending on the baling equipment. The bales are difficult to handle and transport.

SUMMARY OF THE INVENTION

This invention incorporates several simple, but novel ideas into a forklift type vehicle which has been specifically designed, constructed and tested for safely loading, transporting and unloading cylindrical objects such as large round hay bales. Bales can be loaded individually or in sets, and are placed end to end in a tight row which protects bales from the weather.

The novel device is a two or four wheeled towed vehicle having a boom assembly comprising a pair of elongated object engaging booms having adjacent inner edges disposed in spaced substantial parallelism and having forward ends and rearward ends. The booms are held parallel by brace members. A pair of horizontally spaced rear ground engaging means are disposed during object transportation below said booms as seen in side elevation.

A humanly operable and steerable towing means is disposed forwardly of said boom assembly and having at least two ground engaging drive wheels. Forward elevating and connecting means operably correlated with said boom assembly and with said towing means and humanly controllable for causing said forward ends of said booms to raise and lower with respect to said drive wheels. Said towing means and said boom assembly together defining a tow boom assembly.

A humanly operable rear elevation control means mounted on said tow boom assembly and operably correlated with said rear ground engaging means. The rear elevation control means being capable of controlling the distance between the upper side of said booms and the lower surface of said ground engaging means by rotation of said booms in opposite directions about their axes.

The towing means is operable for driving forward or reverse. The forward and rearward ends of said booms are lowered with respect to said drive wheels and with respect to said rear ground engaging means so that towing means can be moved to back the rearward end of said booms along two sides of at least one cylindrical object and under curved sides thereof while said object is resting on a supporting surface over which said lifter-carrier can be driven and whereby said booms can be raised with respect to said pair of ground engaging means so as to support said object on said booms while it is being transported by said lifter-carrier. Each cylindrical object is supported on said booms until the full capacity of lifter-carrier is reached at which time the towing vehicle may be driven to a place of discharge of the cylindrical objects and the booms may be lowered and the vehicle pulled away from the cylindrical objects leaving the cylindrical objects disposed on the surface of the ground at storage site.

Two types of hitches are available depending on the type of towing means being used. The towing means can be attached directly to the front of the triangular "main" hitch in the case of an agricultural tractor tow vehicle, whereby the tractor's two point hitch will lift forward end of tow boom assembly. An optional gooseneck type attachable/detachable hitch can be attached on top of the triangular hitch at three pivot points allowing a truck type towing vehicle to be attached to gooseneck hitch whereby pivoting action of gooseneck hitch causes forward end of tow boom assembly to be raised or lowered by actuating a humanly controllable hydraulic cylinder.

DESCRIPTION OF THE PREFERRED EMBODIMENT

Figure 1:
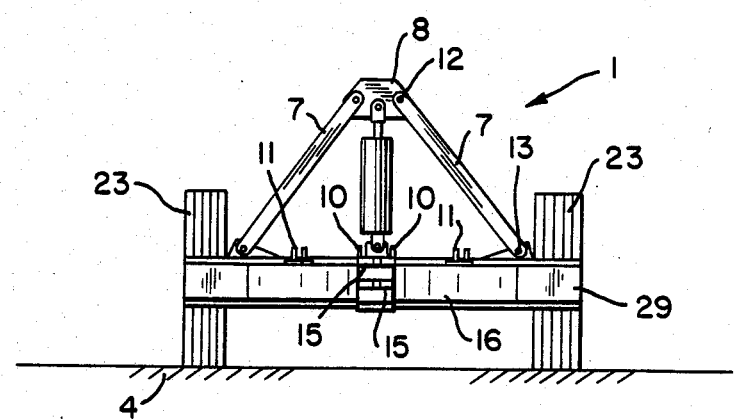
FIG. 1 is a front view of the lifter-carrier in raised position.
Figure 2:
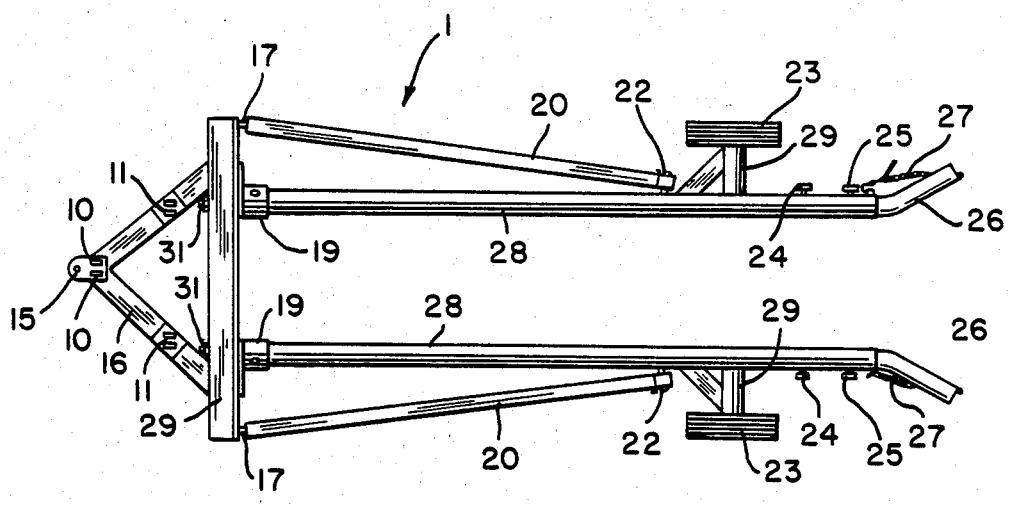
FIG. 2 is a plan view of lifter-carrier in raised position.

Referring to the drawings in detail, specifically FIGS. 1 through 5, reference character 1 generally indicates a cylindrical object retrieving apparatus having a boom assembly comprising a pair of elongated object engaging booms 28 having adjacent inner edges disposed in spaced substantial parallelism. The wheels 23 and wheel supports 29 are fastened directly to said booms with welds or the like. Brace beams 20 retain the booms 28 in their spaced adjacent parallel position and form a triangular geometry with main bar 29. The length of brace beams 20 is adjustable at the threaded rod and jam nuts 17 which are fastened to main bar 29. Increasing or decreasing the length of brace beams will decrease or increase respectively the spacing between rearward ends of said booms 28. The brace beams 20 are fastened with ball socket joints 22 to the booms 28.

The right and left sides of vehicles are symetrical. Lever arms 19 cap the front of booms 28 and are fastened rigidly to booms. Pins 31 pass through the center of lever arms 19 and through holes in main bar, retaining the forward end of booms 28 to main bar 29. Other spare holes in main bar are used to space booms closer together or farther apart as needed to accommodate a smaller or larger diameter respectively cylindrical object. The booms 28 and lever arms 19 rotate on said pins 31 when hydraulic cylinder 6 is actuated. The lever arms 19 are pinned 13 to links 7 and the links are pinned 12 to a yoke 8. The hydraulic cylinder 6 is pinned to yoke 8 and main bar 29. The vertical extension of piston rod of hydraulic cylinder 6 rotates lever arms, booms and wheels 19, 28 and 29 about pins 31 which lowers rearward ends of booms 28 to ground 4. The rotation of booms 28 is limited by set screws 18 which contact lever arms 19 which also sets toe in of wheels 23.

Guide pipes 26 telescope inside booms 28 and are attached rigidly to booms 28 with set screws 24 and 25, which allows for replacement of guide pipes 26 if damaged. The guide pipes 26 extend upward and outward from lowered booms 28 which guides hay bale 30 onto booms 28. A chain and chain tightener 27 can be used to fasten rearward ends of booms 28 for safe transport ensuring cylindrical objects will not fall off booms 28. Rotation of guide pipes 26 causes additional tightening of chain 27 when booms 28 are raising FIG. 5. The chain and chain tightener are stored on their respective hooks (as in FIGS. 2 and 3) when not in use. A tractor drawn main hitch 16 is welded to main bar 29 the frame or the, a tractor's raisable drawbar is fastened to hitch clevis 15 with a suitable pin (not shown).

Figure 6:
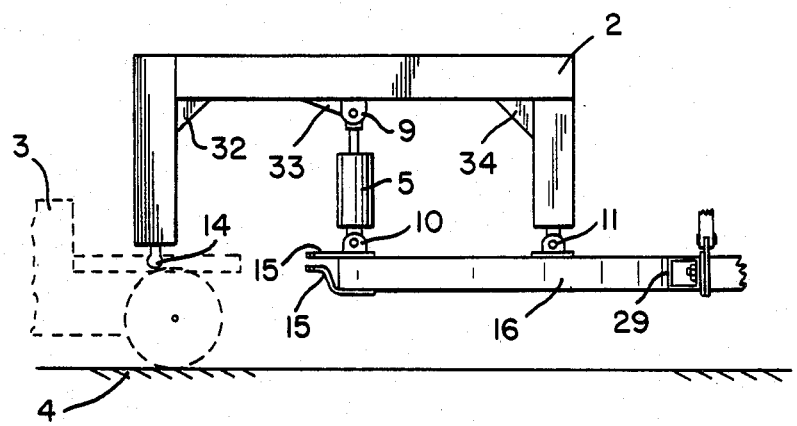
FIG. 6 is a side view of pivotable gooseneck hitch in raised position attached to main hitch and truck towing device.
Figure 7:
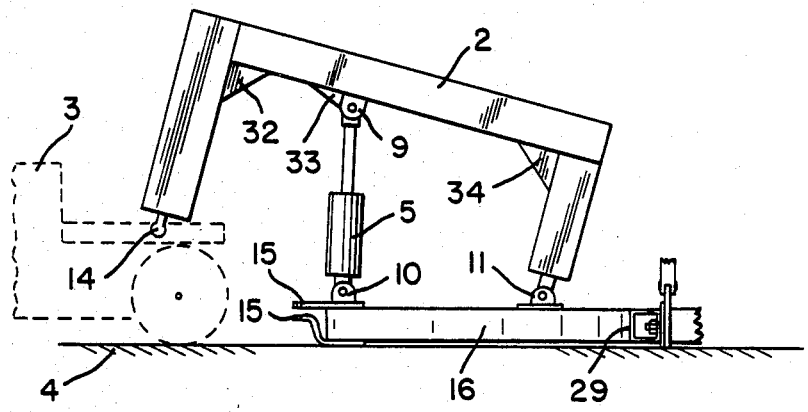
FIG. 7 is a side view of pivotable gooseneck hitch in lowered position attached to main hitch and truck towing device.

A gooseneck hitch 2 can be attached to main hitch 16 at the three clevis locations 10, 11 and 11 with suitable pins. FIG. 6 indicates the gooseneck hitch in the raised position with hydraulic cylinder 5 fully retracted. A hitch ball 14 connects front of gooseneck hitch to truck 3. The towing truck supports the forward end of said lifter-carrier, while the wheels 23 of lifter-carrier give support at the rear. Sufficient clearance between clevis 15 and truck 3 is maintained to allow unobstructed turns. Gussets 32, 33 and 34 strengthen the gooseneck hitch at critical stress areas. FIG. 7 indicates the gooseneck hitch in lowered position with hydraulic cylinder 5 extended. Extension or retraction of hydraulic cylinder 5 causes gooseneck hitch 2 to be rotated about clevis pins 11 and 11 causing hitch 16 to lower or raise respectively over ground 4.

Figure 3:
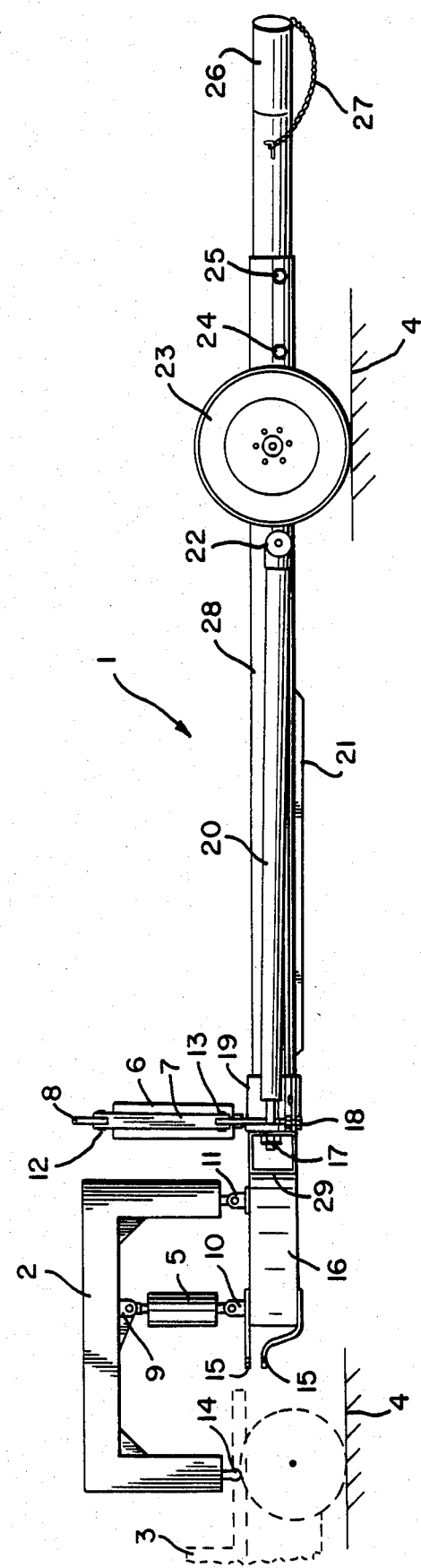
FIG. 3 is a side view of lifter-carrier in raised position.
Figure 4:
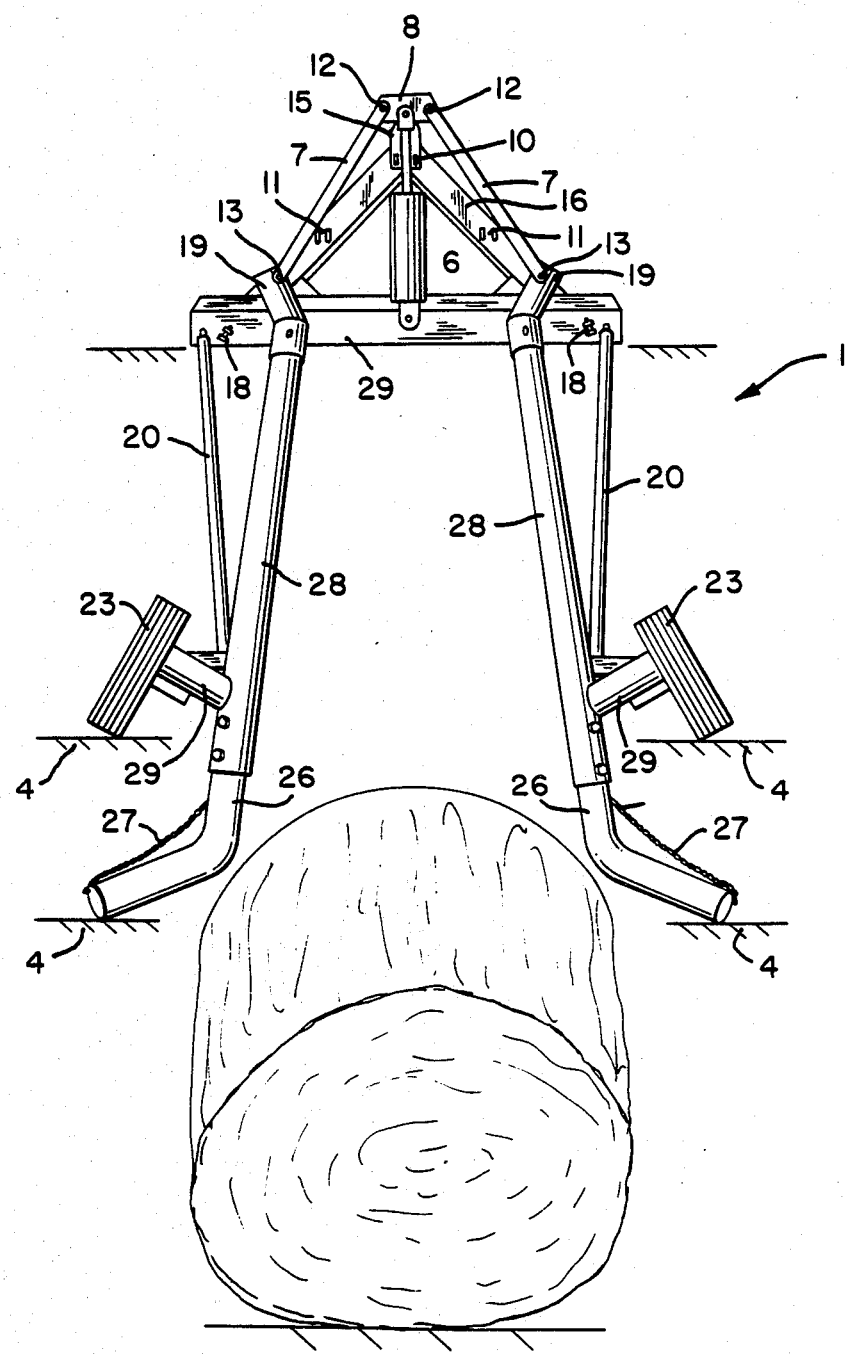
FIG. 4 is a rear view of the lifter-carrier in lowered position for retrieving or discharging at least one hay bale.
Figure 5:
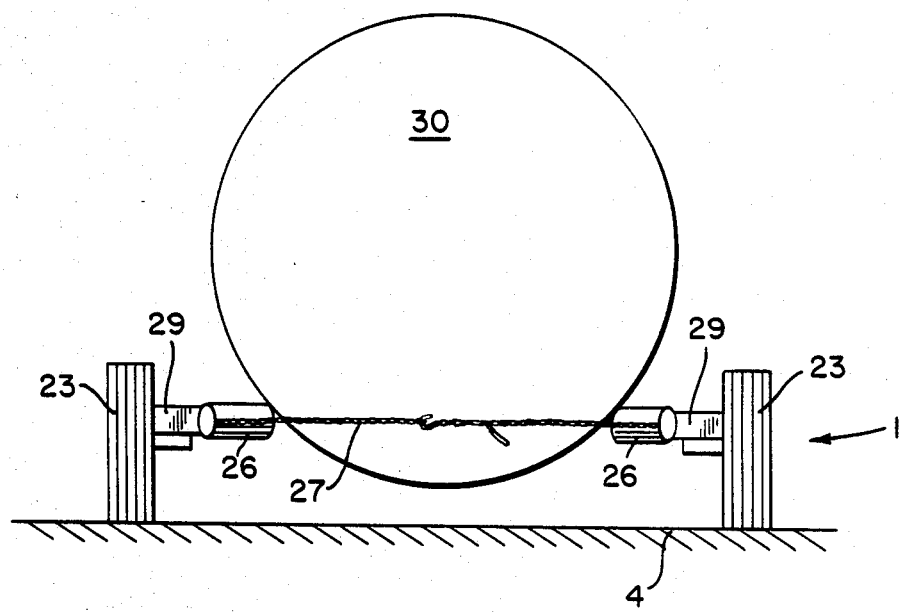
FIG. 5 is a rear view of the lifter-carrier and a loaded bale in raised position.

Referring more to FIGS. 3 through 5 in operation, the lifter-carrier may be connected to a farm tractor tow vehicle drawbar at clevis 15 with a suitable pin. The tractor's drawbar can be raised or lowered which raises or lowers forward end lifter-carrier. The tow boom assembly is pulled in forward direction to the site of the hay bales. The booms are aligned with one or more bales, the tractor's drawbar is lowered which lowers forward end of booms to a position just above ground level but in very close proximity to ground level. The rearward end of booms are then lowered by extending hydraulic cylinder 6 which causes booms to rotate and lower to a point just above ground FIG. 4. The tow vehicle is then driven in reverse causing booms to slide under curved sides of hay bale(s) while bale is resting on surface of ground. The hydraulic cylinder piston rod is then retracted raising rearward ends of booms and tractor drawbar is raised which raises forward ends of booms causing hay bale to be lifted above the ground while curved sides of hay bale rest on the booms FIG. 5.

A second hay bale is retrieved in a similar fashion except forward end of booms are raised slightly higher this time keeping first bale from dragging on ground. Second bale then engages first bale and first bale engages main bar 29 and subsequent bales are gathered in a similar fashion pushing all bales forward until full capacity of vehicle is obtained. The chain and tightener can then be manually hooked up to secure the rearward ends of booms together for safe transport of bales. It should be noted that the brace beams and/or chain must be sufficiently strong to keep booms from spreading apart from forces of bales when the bales are being raised. The loaded vehicle is then towed to the storage site where hydraulic cylinder 6 is extended lowering rearward end of booms to ground and tractor drawbar is lowered which lowers forward end of booms to ground. The chain and tightener are then removed manually and placed on their storage hooks. In this position, all of the bales in between the booms will be deposited onto the surface of the ground and the continued forward movement of the vehicle will disengage the booms from any engagement with the bales whereby the bales may be left in a close, weather proof accumulation for further retrieval or storage as desired. It should be noted that an optional gooseneck hitch and truck tow vehicle can be used to accomplish same task as tractor tow vehicle.

From the foregoing, it will be apparent that the present invention is a novel device for retrieval of cylindrical objects such as hay bales. The novel device comprises a main bar and tractor drawn main hitch. An optional truck drawn gooseneck hitch can be installed onto the main hitch. A pair of parallel booms have an unobstructed opening between them up to their forward ends where they are connected by main bar. A pair of brace beams retain booms in their parallel position but allow rotation of booms. The booms have an opening between them so that they can slide under curved sides of at least one cylindrical object in a straddling type action as vehicle is moved in a rearward direction. A single hydraulic cylinder and dedicated linkage place a torque on pipes which rotates booms causing rearward ends of boom to rise or fall as wheels apply an opposing torque to booms raising cylindrical objects resting on booms. This torque from wheels applied to booms aids in providing a smooth ride since booms now act as torsion springs when wheels travel on uneven terrain. The forward end of vehicle can be raised or lowered by a tractor's raisable/lowerable drawbar attached to main hitch, or an optional gooseneck hitch can be attached to main hitch at three pivot points to accomplish the same task with a truck tow vehicle.

The gooseneck hitch has a single hydraulic cylinder which raises forward end of gooseneck with respect to main hitch lowering main hitch to ground level. Gooseneck hitch is retained to truck with a ball so that ball end of gooseneck hitch remains a substantially fixed height above the ground at all times. The gooseneck hitch allows transport with a truck over longer distances and at higher speeds than with only a tractor drawn vehicle. A hydraulic system on the truck is required for actuating the two hydraulic cylinders on gooseneck hitched vehicle.

The present invention has been described in particular relation to the drawings attached hereto, it should be understood that other modifications apart from those shown or suggested herein, may be made within the spirit and scope of this invention.

What is claimed is:

1. A lifter carrier for objects having cylindrical exterior surfaces comprising a boom assembly comprising a pair of elongated rotatable object-engaging booms having adjacent inner edges disposed in spaced substantial parallelism and having forward ends and rearward ends, said booms each having a longitudinal axis of rotation, a frame extending transverselly of said booms, means connecting said booms to said frame for the rotation of said booms about said axes respectively, a pair of brace beams attached to said frame at their forward ends and each having a rearward end connected to a respective one of said booms, said beams inclining toward said booms as the rearward ends of said brace beams are approached whereby said brace beams maintain said booms in spaced substantially parallel positions, a pair of horizontaly spaced rear ground-engaging means each having a ground-engaging surface attached directly to said booms and having lower portions each disposed during object-transportation at a substantial spacing below the respective one of said booms as seen in rear elevation, a humanly operable and steerable towing means disposed forwardly of said boom assembly and having at least two ground-engaging drive wheels, hitch means connecting said towing means and said main frame, forward elevating and connecting means operably correlated with said boom assembly and with said towing means and capable of being humanly controllable for causing said forward ends of said booms to raise and lower with respect to said drive wheels, said towing means and said boom assembly together defining a tow-boom assembly, a humanly operable boom elevation control means capable of controlling the rotational position of said booms with respect to said bar for disposing said ground-engaging surfaces each more to a side of its respective boom for loading than for object-transportation so that the upper surfaces of said booms are lower for object-loading and higher for object-transportation, said towing means being operable for driving forwardly or reverse whereby when said booms are in lower positions with respect to said drive wheels and with respect to said ground-engaging surfaces of said ground-engaging means then said towing means can be moved so as to back the rearward ends of said booms along two sides respectively of at least one of said cylindrical objects and under the curved sides thereof while said object is resting with its said cylindrical surface on a supporting surface over which said lifter carrier can be driven and whereby said booms can be raised with respect to said wheels and with respect to said pair of ground-engaging means so as to support said object while it is being transported by said lifter carrier.

2. The lifter carrier of claim 1 having a humanly controllable hydraulic cylinder mounted on said frame, said means connecting said cylinder to said hitch means whereby retraction or extension of said hydraulic cylinder will raise or lower respectively said frame and the forward end of said booms with respect to said ground surface.

3. The lifter carrier of claim 2 having said means connecting said cylinder to said hitch means being a gooseneck hitch.

4. The lifter of claim 1 having said means rotatably attaching said booms to said frame being adjustable for various spacings of said booms so as to accomodate different diametered cylindrical objects.

* * * * *